J. A. HOWE.
CONNECTING DEVICE.
APPLICATION FILED SEPT. 20, 1916.
1,206,849.
Patented Dec. 5, 1916.
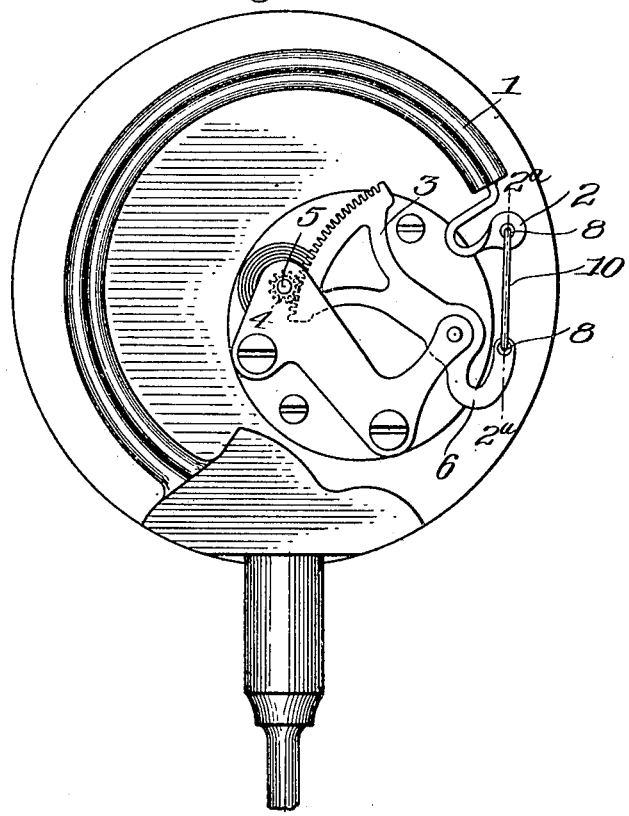
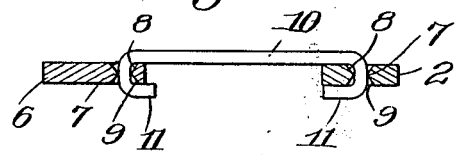
WITNESSES:
Nelson H. Copp
Harriet Day.
INVENTOR
James A. Howe
BY
his ATTORNEYS

UNITED STATES PATENT OFFICE.

JAMES A. HOWE, OF ROCHESTER, NEW YORK, ASSIGNOR TO TAYLOR INSTRUMENT COMPANIES, OF ROCHESTER, NEW YORK, A CORPORATION OF NEW YORK.

CONNECTING DEVICE.

1,206,849.   Specification of Letters Patent.   Patented Dec. 5, 1916.

Application filed September 20, 1916. Serial No. 121,111.

*To all whom it may concern:*

Be it known that I, JAMES A. HOWE, of Rochester, in the county of Monroe and State of New York, have invented certain new and useful Improvements in Connecting Devices; and I do hereby declare the following to be a full, clear, and exact description of the same, reference being had to the accompanying drawings, forming a part of this specification, and to the reference-numerals marked thereon.

The purpose of my improvement is to afford a practicable and efficient connection between two movable parts to serve as a joining link, and it is designed with particular reference to instruments of fine construction and adjustment, such as sphygmomanometers, where precision as well as maximum elimination of friction are controlling factors.

To these and other ends the invention consists in certain improvements and combinations of parts, all as will be hereinafter more fully described, the novel features being pointed out in the claims at the end of the specification.

In the drawings: Figure 1 is a plan view of a mechanism showing a preferred application of the invention, and Fig. 2 is a sectional view on the line 2ª—2ª of Fig. 1.

Similar reference numerals in the several figures indicate the same parts.

In the present structure, 1 designates a pressure controlled member adapted to be expanded or contracted under different pressure conditions, and 2 is an extension thereon, which is adapted to be operatively connected with the indicating mechanism. The latter includes a gear segment 3 engaging a pinion 4 on an arbor 5, which may be provided with an indicator or hand. The gear segment 3 carries a tail piece or extension 6, which with the extension 2 constitutes the two movable members between which connection is made. To this end, both of the members 2 and 6 are provided with openings, and are undercut on opposite sides adjacent said openings so as to afford in each opening a circular edge 7, which is preferably disposed intermediate the opposite sides of each member. The edge 7 is formed by inclined or beveled walls 8 and 9, extending in opposite directions from the center of the opening toward the faces of the member.

Other methods may be adopted for accomplishing the same purpose, as for instance, the beveled edge may be disposed at one end of the opening instead of at the center, and in either instance a sharp edge is afforded to receive the connector and thereby reduce the amount of friction to the greatest degree possible. For joining the members just described, I prefer to employ a connector 10 of cylindrical cross section and in the form of a wire or rod. The ends 11 of the connector are passed through the openings in the members 2 and 6 and are bent back upon the body of the connector toward each other in the manner shown in Fig. 2. It will be seen that the cylindrical contour of the connector in coöperation with the circular edge against which it bears, affords a close fitting joint in which a minimum amount of friction is present. The form of the bearing permits free play of the movable parts but without lost motion, and makes it possible to connect the parts readily and securely.

The structure does away entirely with rivets, pins or other similar connecting members, and affords a connection between two movable parts that can be readily and economically manufactured and assembled, and when once in proper relation, holds the connected parts together indefinitely without requiring repair or other attention.

I claim as my invention:

1. The combination with a pair of movable members, each having an opening therethrough defined by an edge intermediate the opposite faces of the member, of an integral connector having its ends extending through said openings and bent toward each other.

2. The combination with a pair of movable members, each having an opening therethrough defined by a circular edge, beveled from the center toward opposite faces of the member, of an integral connector having its ends extending through said openings and bent toward each other.

3. The combination with a pair of movable members, each having an opening therethrough defined by a circular beveled edge, of an integral connector having its ends extending through said openings and bent toward each other.

4. The combination with a pair of movable members, each having an opening therethrough and undercut on opposite sides adjacent said opening, affording a circular edge intermediate opposite faces of the member, of an integral connector of cylindrical cross section having its ends extending through said openings of the members and bent toward each other.

JAMES A. HOWE.

Copies of this patent may be obtained for five cents each, by addressing the "Commissioner of Patents, Washington, D. C."